US 6,897,269 B2

(12) United States Patent
Schreck et al.

(10) Patent No.: US 6,897,269 B2
(45) Date of Patent: May 24, 2005

(54) PROCESSES FOR TRANSITIONING BETWEEN ZIEGLER-NATTA AND ALUMOXANE-BASED SINGLE-SITE POLYMERIZATION CATALYSTS

(75) Inventors: David James Schreck, Midland, MI (US); Mark G. Goode, Hurricane, WV (US)

(73) Assignee: Univation Technologies, LLC, Houston, TX (US)

(*) Notice: Subject to any disclaimer, the term of this patent is extended or adjusted under 35 U.S.C. 154(b) by 51 days.

(21) Appl. No.: 10/690,138

(22) Filed: Oct. 21, 2003

(65) Prior Publication Data

US 2005/0059784 A1 Mar. 17, 2005

Related U.S. Application Data

(60) Provisional application No. 60/436,762, filed on Dec. 27, 2002.

(51) Int. Cl.$^7$ .................................................. C08F 2/38
(52) U.S. Cl. ......................... 526/82; 526/83; 526/84; 526/85; 526/201; 526/202; 526/901
(58) Field of Search .............................. 526/82, 83, 84, 526/85, 201, 202, 901

(56) References Cited

U.S. PATENT DOCUMENTS

| | | | |
|---|---|---|---|
| 4,306,044 A | 12/1981 | Charsley | 526/84 |
| 4,460,755 A | 7/1984 | Williams et al. | 526/84 |
| 4,701,489 A | 10/1987 | Hughes et al. | 524/349 |
| 4,834,947 A | 5/1989 | Cook et al. | 422/117 |
| 5,227,438 A | 7/1993 | Rebhan | 526/82 |
| 5,270,408 A | 12/1993 | Craddock, III et al. | 526/82 |
| 5,371,053 A | 12/1994 | Agapiou et al. | 502/56 |
| 5,442,019 A | 8/1995 | Agapiou et al. | 526/82 |
| 5,672,665 A | 9/1997 | Agapiou et al. | 526/82 |
| 5,672,666 A | 9/1997 | Muhle et al. | 526/82 |
| 5,753,786 A | 5/1998 | Agapiou et al. | 526/82 |
| 6,359,084 B1 | 3/2002 | Herzog et al. | 526/84 |
| 6,388,027 B1 | 5/2002 | Zilker, Jr. et al. | 526/82 |

FOREIGN PATENT DOCUMENTS

| | | |
|---|---|---|
| EP | 0471479 B | 2/1992 |
| EP | 0116917 A | 3/1998 |
| EP | 0829491 A2 | 3/1998 |
| WO | WO 92/14766 | 9/1992 |
| WO | WO 98/30599 | 7/1998 |

*Primary Examiner*—Fred Teskin
(74) *Attorney, Agent, or Firm*—Osborne K. McKinney

(57) ABSTRACT

Processes for transitioning among polymerization catalyst systems, preferably catalyst systems that are incompatible with each other. In particular, the processes relate to transitioning among olefin polymerization reactions utilizing Ziegler-Natta catalyst systems, metallocene catalyst systems and other MAO-based single site catalyst systems.

18 Claims, No Drawings

PROCESSES FOR TRANSITIONING BETWEEN ZIEGLER-NATTA AND ALUMOXANE-BASED SINGLE-SITE POLYMERIZATION CATALYSTS

CROSS-REFERENCE TO RELATED APPLICATION

The present Application claims priority to U.S. Provisional Patent Application U.S. Ser. No. 60/436,762, filed Dec. 27, 2002.

FIELD OF INVENTION

This invention relates to processes for transitioning among polymerization catalyst systems, preferably catalyst systems that are incompatible with each other. Particularly, the invention relates to processes for transitioning among olefin polymerization reactions utilizing Ziegler-Natta catalyst systems and metallocene or other MAO-based, single-site catalysts, which includes any olefin polymerization catalyst system comprising; (a) an alumoxane as a co-catalyst (or activator) or scavenger or both; and (b) a metal compound characterized as having substantially a single active site for coordination polymerization.

BACKGROUND OF THE INVENTION

During the production of olefin polymers in a commercial reactor it is often necessary to transition from one type of catalyst system producing polymers having certain properties and characteristics to another catalyst system capable of producing polymers of different chemical and/or physical attributes. Transitioning between similar Ziegler-Natta catalyst systems, or compatible catalyst systems, for instance, generally takes place easily. However, where the catalyst systems are incompatible or of different types the process is typically complicated. For example, when transitioning between two incompatible catalyst systems such as a Ziegler-Natta catalyst system and a metallocene catalyst system, it has been found that some of the components of the Ziegler-Natta catalyst system act as poisons to the metallocene catalyst system. Consequently, the components of the Ziegler-Natta catalyst system prevent the metallocene catalyst system from promoting polymerization.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition.

It would be highly advantageous to have a process for transitioning between incompatible catalysts, without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

SUMMARY OF THE INVENTION

The present invention is drawn to processes for transitioning between at least two catalysts and/or catalyst systems in a polymerization process. We discovered that surprisingly certain materials referenced herein as non-volatile adsorbents function as effective kill agents or catalyst deactivators to effectuate efficient transitions between incompatible Ziegler-Natta and MAO-based, single site catalyst systems. According to a preferred embodiment of the present invention, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a first catalyst to a second polymerization reaction conducted in the presence of a second catalyst wherein the first and second catalysts are incompatible, includes:

(a) discontinuing the introduction of the first catalyst into a reactor wherein the first catalyst comprises a Ziegler-Natta catalyst;

(b) introducing and dispersing in the reactor an effective amount of a non-volatile adsorbent to deactivate the first catalyst and substantially halt the first polymerization reaction; and (c) introducing and dispersing in the reactor the second catalyst wherein the second catalyst comprises a MAO-based, single-site catalyst.

According to another preferred embodiment of the present invention, the Ziegler-Natta catalyst comprises a titanium-triethylaluminum catalyst. According to another preferred embodiment of the present invention, the MAO-based, single-site catalyst comprises a metallocene catalyst.

DETAILED DESCRIPTION OF THE INVENTION

The present invention relates to processes for transitioning between catalysts and/or catalyst systems to convert a reactor from producing one type of product to another with minimal reactor down-time.

In particular, preferred processes are drawn to transitioning between Ziegler-Natta catalysts/catalyst systems and metallocene catalysts/catalyst systems. For the purposes of this patent specification and appended claims the terms "catalyst" and "catalyst system" shall be used interchangeably and shall have the identical meaning.

In the present invention, the term "MAO-based, single-site catalyst" is meant to refer to any olefin polymerization catalyst system comprising; (a) an alumoxane as a co-catalyst (or activator) or scavenger or both; and (b) a metal compound characterized as having substantially a single active site for coordination polymerization.

The non-volatile adsorbent is a solid polymer or a compound that is a non-volatile liquid under the conditions in the reactor. The non-volatile liquid under the conditions in the reactor does not necessarily have to be in a liquid state under non-reactor conditions and could, in fact, be a solid under non-reactor conditions. In the present invention, the term "non-volatile" means that the adsorbent, at reactor conditions, has a vapor pressure of 1 torr or less. Preferably, the non-volatile adsorbent is a solid polymer comprising a long chain copolymer of ethylene and a substituted alkene containing at least one functional group capable of effectively deactivating a Ziegler-Natta catalyst. In the present invention, the term "long-chain" means a linear, branched or cyclic compound containing 12 or more carbon or non-H atoms as side-chains relative to the polymer backbone. More preferably, the non-volatile adsorbent comprises a long chain co- or terpolymer of ethylene and one or more co-monomers having a functional group that can react with an aluminum alkyl such as acrylates, vinyl esters, vinyl alcohols, olefinic anhydrides, olefinic carboxylic esters, olefinic carboxylic acids, olefinic ethers, olefinic amines, olefinic alcohols, olefinic amides, olefinic imines, and olefinic thiols. Still more preferably, the non-volatile adsorbent comprises one or more long chain polymers such as poly (ethylene-co-vinyl acetate), poly(ethylene-co-methyl acrylate), poly(ethylene-co-acrylic acid), poly(ethylene-co-methacrylic acid), poly(ethylene-co-ethyl acrylate-co-maleic anhydride), poly(ethylene-co-butyl acrylate-co-maleic anhydride), poly(ethylene oxide) and poly(ethylene imine). Most preferably the non-volatile adsorbent polymer is poly(ethylene-co-acrylic acid), poly(ethylene-co-ethyl acrylate-co-maleic anhydride), poly(ethylene-co-butyl acrylate-co-maleic anhydride), or poly(ethylene-co-vinyl acetate).

The non-volatile adsorbent may also be selected from the group consisting of alkoxylated amines, alkoxylated amides, carboxylic acids, thiols, and alcohols. More preferably, the non-volatile liquid under conditions in the reactor comprises a long-chain diethanolamine and still more preferably the non-volatile liquid comprises N-octadecyl-diethanolamine or N-hexadecyl-diethanolamine.

The non-volative adsorbent is used in the present invention at an effective amount to deactivate the first catalyst system. Effective amounts will be in the range from about 01 to about 10,000 mg per liter of reactor volume, preferably in the range from about 1 to about 7,500 mg per liter of reactor volume, more preferably in the range from about 10 to about 5,000 mg per liter of reactor volume.

The non-volatile adsorbents variably decrease catalyst activities which may include complete deactivation.

The non-volatile adsorbent will preferably decrease the activity of the first catalyst system at least 30 percent or more, more preferably at least 70 percent or more, and most preferably at least 90 percent or more.

The processes of the present invention preferably are used in gas phase, solution phase, slurry or bulk phase polymerization processes. Most preferably, the processes of the present invention are used in a gas phase polymerization process in a fluidized bed reactor.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization reaction. For detailed descriptions of gas phase fluidized bed polymerization processes, see U.S. Pat. Nos. 4,543,399 and 4,588,790, 5,028,670, 5,352,769 and 5,405,922 the disclosures of which are hereby fully incorporated herein by reference.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2-15 carbon atoms, for example, alpha-olefin of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. In the preferred embodiments of the present invention, the gas composition contains ethylene and at least one alpha-olefin having 3 to 15 carbon atoms.

Typically, the gas composition also contains an amount of hydrogen to control the melt index of the polymer to be produced. In typical circumstances the gas also contains an amount of a dew point increasing component with the balance of the gas composition made up of non-condensable inerts, for example, nitrogen.

Depending on the second catalyst to be introduced into the reactor the gas concentrations of the various components of the gas composition can be altered, for instance, the comonomer and hydrogen gas concentrations can be increased or decreased.

When transitioning between compatible catalysts there are typically only slight differences in their performance towards hydrogen and comonomer, however, when transitioning between incompatible catalysts it is not as straightforward. For example, Ziegler-Natta and metallocene catalysts have extremely different responses to molecular weight regulators, such as hydrogen and comonomer, which makes these catalysts incompatible. Any traces of active Ziegler-Natta catalyst will produce very high molecular weight product under metallocene catalyst reactor conditions. Furthermore, particularly in a continuous transition process, the interaction between two incompatible catalysts may lead to production of high levels of small particles less than about 100 microns, termed fines. These fines can induce operability problems in the reactor such as fouling and sheeting.

During the transition from a first catalyst to a second catalyst, particularly in a continuous process, it is reasonable to expect that interaction or contact of the two catalysts will occur. For compatible catalysts, the transition normally occurs by discontinuing the feed of the first catalyst while commencing the feed of the second catalyst. Typically it takes many hours until the first catalyst is entirely consumed. So, for a relatively long period of time the resin produced is a mixture from both the first and the second catalyst.

Compatible catalysts are those catalysts having similar kinetics of termination and insertion of monomer and comonomer(s) and/or do not detrimentally interact with each other.

For the purposes of this patent specification and appended claims the term "incompatible catalysts" shall refer to and mean catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%.

As noted above, preferred processes of the present invention are applicable to, transitioning between a Ziegler-Natta catalyst and a metallocene catalyst. According to this process in a steady state operation with a Ziegler-Natta catalyst, the first polymerization reaction is halted by first discontinuing the introduction to the reactor of the Ziegler-Natta catalyst, followed by introducing and dispersing in the reactor an effective amount of a non-volatile adsorbent to deactivate the Ziegler-Natta catalyst and substantially halt the first polymerization reaction. In the present invention, the term "non-volatile" means that the adsorbent, at reactor conditions, has a vapor pressure of 1 torr or less. After the first polymerization reaction is halted, the process continues by introducing and dispersing in the reactor is a MAO-based, single-site catalyst, to initiate and accomplish the second polymerization reaction at steady state conditions. In the present invention, an MAO-based, single-site catalyst is meant to include any olefin polymerization catalyst system comprising; (a) an alumoxane as a co-catalyst (or activator) or scavenger or both; and (b) a metal compound characterized as having substantially a single active site for coordination polymerization. The present invention contemplates various embodiments of the process claimed, which are non-limiting. Preferably, the polymerization process if a continuous phase polymerization process conducted in a fluidized bed reactor.

Preferably, the Ziegler-Natta catalyst comprises a titanium-triethylaluminum catalyst and the MAO-based single-site catalyst comprises a metallocene catalyst.

Preferably, the non-volatile adsorbent is a solid polymer or a non-volatile liquid under conditions in the reactor.

More preferably, the non-volatile adsorbent is a solid polymer comprising a long chain copolymer of ethylene and a substituted alkene containing at least one functional group capable of effectively deactivating the first catalyst. In the present invention, the term "long-chain" means a linear, branched or cyclic compound containing 12 or more carbon or non-hydrogen atoms as side-chains relative to the polymer backbone. Most preferably, the non-volatile adsorbent comprises a long chain co- or terpolymer of ethylene and one or more co-monomers having a functional group that can react with an aluminum alkyl such as acrylates, vinyl esters, vinyl alcohols, olefinic anhydrides, olefinic carboxylic esters, olefinic carboxylic acids, olefinic ethers, olefinic amines, olefinic alcohols, olefinic amides, olefinic imines, and olefinic thiols. Still more preferably, the non-volatile adsorbent comprises one or more long chain polymers such as poly(ethylene-co-vinyl acetate) (which are supplied by Dupont Chemical Company and are also known as ethylene/vinyl acetate copolymers and, where vinyl acetate concentration is higher than the ethylene concentration, vinyl acetate/ethylene interpolymers), poly(ethylene-co-methyl acrylate), poly(ethylene-co-acrylic acid) (which are also known. as ethylene/acrylic acid copolymers such as those supplied by The Dow Chemical Company and, where acrylic acid concentration is higher than the ethylene concentration, acrylic acid/ethylene interpolymers), poly(ethylene-co-methacrylic acid) (which are also known as ethylene/methacrylic acid copolymers such those supplied by Dupont Chemical Company),. poly(ethylene-co-ethyl.acrylate-co-maleic anhydride), poly(ethylene-co-butyl acrylate-co-maleic anhydride), poly(ethylene oxide) and poly(ethylene imine). Most preferably the non-volatile adsorbent polymer is poly(ethylene-co-acrylic acid), poly(ethylene-co-ethyl acrylate-co-maleic anhydride), poly(ethylene-co-butyl acrylate-co-maleic anhydride) or poly(ethylene-co-vinyl acetate). Those of ordinary skill in the art will recognize that other suitable solid polymer non-volatile adsorbents may also be used.

When the non-volatile adsorbent is a non-volatile liquid under conditions in the reactor, it may be selected from the group consisting of alkoxylated amines, alkoxylated amides, carboxylic acids, thiols and alcohols. More preferably, the non-volatile liquid comprises a long-chain diethanolamine. Still more preferably the non-volatile liquid comprises N-octadecyl-diethanolamine or N-hexadecyl-diethanolamine. Those of ordinary skill in the art will recognize that other suitable compounds that are non-volatile liquids under conditions in the reactor may also be used. For other suitable non-limiting examples of compounds that may be non-volatile liquids under conditions in the reactor, see U.S. Pat. No. 6,369,174, the entire contents of which are incorporated by reference.

All polymerization catalysts including conventional-type transition metal catalysts and bulky ligand metallocene-type catalysts are suitable for use in the processes of the present invention. The following is a non-limiting discussion of the various polymerization catalysts useful in the invention.

Conventional-Type Transition Metal Catalysts

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741 the disclosures of which are hereby fully incorporated herein by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3 AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. Catalysts derived from Mg/Ti/Cl/THF are particularly preferred, which are well known to those of ordinary skill in the art. One non-limiting example of the general method of preparation of such a catalyst includes the following: dissolve $TiCl_4$ in THF, reduce the compound to $TiCl_3$ using Mg, add $MgCl_2$, and remove the solvent. See also U.S. Pat. No. 5,290,745, Example 1b, the disclosure of which is incorporated herein by reference.

British Patent Application No. 2,105,355 and U.S. Pat. No. 5,317,036, the disclosures of which are hereby incorporated herein by reference, describe various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where "Bu" means "butyl" and $VO(OC_2H_5)_3$; vanadium tetra-halide and vanadium alkoxy halides such as $VCl_4$ and $VCl_3$ (OBu); vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR, where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, the disclosures of which are hereby fully incorporated herein by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 the disclosures of which are hereby fully incorporated herein by reference.

For more details on Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495, and 5,070,055, the disclosures of which are hereby incorporated herein by reference.

Typically, these conventional-type transition metal catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^3M^4_v X^2_c R^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB, or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221, 002 and 5,093,415, the disclosures of which are hereby fully incorporated herein by reference.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligand is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B M Q_n \quad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q.

For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by $$L^A A L^B M Q_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2SiR'_2Si$, $R'_2Ge$, R'P, where R' is independently, a radical group which is hydride; hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalyst compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (II) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably, J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$ (YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 the disclosures of which are herein incorporated herein by reference.

In another embodiment, the bulky ligand metallocene-type catalyst compounds are those complexes known as transition metal catalysts based on bidentate ligands containing pyridine or quinoline moieties, such as those described in U.S. Pat. Nos. 6,103,357 and 6,103,620 the disclosures of which are hereby incorporated herein by reference. In another embodiment, the bulky ligand metallocene-type catalyst compounds are those described in PCT publications WO 99/01481 and WO 98/42664, the disclosures of which are hereby fully incorporated herein by reference.

In one embodiment, the bulky ligand metallocene-type catalyst compound is represented by the formula:

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, the disclosures of which are hereby fully incorporated herein by reference. These complexes can be either dialkyl ether adducts, or alkylated reaction products of the described dihalide complexes that can be activated to a cationic state by the activators of this invention described below.

Also included as bulky ligand metallocene-type catalysts are those diimine based ligands of Group 8 to 10 metal compounds disclosed in PCT publications WO 96/23010 and WO 97/48735 and Gibson, et. al., Chem. Comm., pp. 849–850 (1998), the disclosures of which are hereby incorporated herein by reference.

Other bulky ligand metallocene-type catalysts are those Group 5 and 6 metal imido complexes described in EP-A2-0 816 384 and U.S. Pat. No. 5,851,945, the disclosures of which are hereby incorporated herein by reference. In addition, bulky ligand metallocene-type catalysts include bridged bis(arylamido) Group 4 compounds described by D. H. McConville, et al., in Organometallics 1195, 14, 5478–5480, the disclosure of which is hereby incorporated herein by reference. Other bulky ligand metallocene-type catalysts are described as bis(hydroxy aromatic nitrogen ligands) in U.S. Pat. No. 5,852,146, the disclosure of which is hereby incorporated herein by reference. Other metallocene-type catalysts containing one or more Group 15 atoms include those described in WO 98/46651, the disclosure of which is hereby incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, the disclosure of which is hereby incorporated herein by reference) and mixtures thereof.

the reactor with ethylene, and the residue in the bomb was flushed into the reactor using more hexane. The polymerization was then continued 20 minutes further, and the reaction terminated by venting the polymerization gases and opening the reactor. Reactor pressure during the polymerization was maintained by a computer control that adjusted a mass flow controller, and the instantaneous rate of the polymerization reaction was followed by the flow of gas through the mass flow controller.

| Example No. | Non-Volatile Adsorbent | Composition (polymers only) | | | Amount Added (g) | Final Activity[c] | Activity Loss (%)[d] |
|---|---|---|---|---|---|---|---|
| | | Functional C m n m r | Wt. %[a] | mmol/g | | | |
| 1 | None | N/A | N/A | N/A | N/A | 8239 | N/A |
| 2 | poly(ethylene-alt-maleic anhydride) | maleic anhydride | 16 | 7.9 | 0.2 | 7562 | 8% |
| 3 | poly(ethylene imine) in silica gel | aziridine | N/A[b] | N/A[b] | 1.0 | 5019 | 39% |
| 4 | poly(ethylene-co-methyl acrylate) | methyl acrylate | 6.5 | 0.76 | 0.66 | 1833 | 78% |
| 5 | poly(ethylene oxide) | ethylene oxide | 100 | 22.7 | 0.57 | 1663 | 80% |
| 6 | poly(ethylene-co-butyl acrylate-co-maleic anhydride) | butyl acrylate maleic anhydride | 5.5 3.5 | 0.38 0.36 | 0.55 | 684 | 92% |
| 7 | poly(ethylene-co-ethyl acrylate-co-maleic anhydride) | ethyl acrylate maleic anhydride | 9 3 | 0.89 0.31 | 0.35 | 543 | 93% |
| 8 | poly(ethylene-co-vinyl acetate) | vinyl acetate | 9 | 1.05 | 0.48 | 744 | 91% |
| 9 | ATMER 163 | N/A | N/A | N/A | 0.060 | 328 | 96% |
| 10 | poly(ethylene-co-acrylic acid) | acrylic acid | 5 | 0.69 | 4.4 | 142 | 98% |

Notes:
[a]Composition as listed in the supplier's catalog
[b]PEI adsorbed in silica, no loading listed in supplier's catalog
[c]Final instantaneous activity, as measured by ethylene flow, in grams PE/mmol Ti/hour/100 psi ethylene
[d]Difference in activity, in percent, between the final activities of the blank example and the d the non-volatile adsorbent example In order to provide a better understanding of the present invention, the following example(s) is/are offered as related to actual tests performed in the practice of the invention.

EXAMPLES

In order to provide a better understanding of the present invention, the following nonlimiting examples are offered as related to actual tests performed in the practice of this invention.

General Conditions for Examples 1–10

All materials were purchased commercially and used as received. The catalyst used was a spray-dried 5:1 $MgCl_2$/$TiCl_3$/THF catalyst, prepared as described in Example 1b in U.S. Pat. No. 5,290,745, the entire contents of which are hereby incorporated by reference. A computer-controlled, one liter 316 stainless steel reactor with air-operated two-wing paddle stirrer and an inner steam-heated shell and an outer water-cooled shell was dried by heating to 135° C. while purging with 500 sccm of nitrogen for 30 minutes. After cooling to 50° C., it was charged with 600 mL hexane under inert conditions. The catalyst charging vessel containing the catalyst and cocatalyst was then attached to the reactor against a nitrogen purge. The reservoir above the injection tube was pressurized to 235 psi with nitrogen. The reactor was sealed, heated to 85° C. and pressurized with ethylene (135 psi ethylene partial pressure). A slurry polymerization using a Mg/Ti/Cl/THF catalyst system (15 mmol Ti) and $Et_3Al$ cocatalyst (0.5 mmol Al, Al/Ti ca. 33:1) was initiated in the reactor, and the reaction was allowed to stabilize. After 20 minutes, a non-volatile adsorbent was added (according to the table below) as a slurry in 50 mL of hexane from a bomb attached to the reactor, pressured into Example 11

Ziegler-Natta to Metallocene Transition in a Fluidized Bed

An active Ziegler-Natta polymerization utilizing a $MgCl_2$/$TiCl_3$/THF catalyst supported on dehydrated and TEA-treated 955 silica with TEA (triethyl aluminum) cocatalyst was conducted in a continuous gas phase fluidized bed reactor having a nominal diameter of about 14 inches and a bed weight of about 120 lbs. Reactor temperature was 85° C. The total pressure was about 350 psig with about 120 psi ethylene monomer partial pressure and hydrogen and hexene present in proportions to produce about a 1 dg/min MI and 0.918 g/cc density polymer. The cycle gas velocity was about 2 ft/sec and the resin production rate was about 35 lbs/hr. The TEA concentration in the bed was about 200 ppmw and was added directly to the fluidized bed as a diluted solution in isopentane. To begin the transition from the Ziegler-Natta catalyzed polymerization to a metallocene-catalyzed polymerization, the $MgCl_2$/$TiCl_3$/THF catalyst feed and TEA cocatalyst feed were discontinued.

An long-chain diethanolamine commercially available under the trade name ATMER-163 from ICI Specialty Chemicals was then added to the reactor fluidized bed to achieve a concentration of 1000 ppmw on a polymer bed weight basis. This was approximately four times the calculated amount necessary to react with the aluminum alkyl, and less such as 2:1 or 1:1, or less than 1:1 ATMER-163:TEA molar ratio could also have been used. The ATMER-163 stopped the polymerization activity completely within a few minutes based upon a heat balance around the fluid bed and the automatic stopping of the monomer feeds by the control system. The reactor was held at temperature with other conditions constant for 12 hours without polymerization reaction and was then purged with high purity nitrogen to remove hydrogen and monomers in preparation for establishing conditions for the metallocene polymerization. The 12-hour hold after ATMER-163 addition could be reduced to an hour or two, a few minutes or possibly eliminated. The ATMER-163 was added almost immediately after discontinuing the Ti-based catalyst feed, but it would also have been possible to allow the polymerization reaction to decay over a period. of time to remove some of the catalyst and cocatalyst from the bed prior to starting the transition.

After the nitrogen purging, the ATMER-163 addition, and the 12-hour hold period described above, reactor conditions of 85° C., 350 psig total pressure, 200 psi ethylene partial pressure, and approximately 150 ppmw hydrogen and hexene were established to produce a polymer having about a 1 dg/min MI and a 0.918 g/cc density. The bed weight remained about 120 lbs and the cycle gas velocity maintained at about 2.0 ft/sec A metallocene catalyst system comprising bis(1,3-methyl butyl cyclopentadienyl) zirconium dichloride and methylalumoxane was then added to the reactor. The metallocene catalyst system is well known to those of ordinary skill in the art and a non-limiting example of the general method of preparation thereof is described in U.S. Pat. No. 5,747,612, the entire contents of which is incorporated by reference. After the introduction of the metallocene catalyst system to the reactor, polymerization was reinitiated very rapidly and the reactor operated successfully for about 40 hours (producing a polymer having about a 1 dg/min MI and a 0.918 g/cc density) when the experiment was concluded. The lack of high molecular weight gels in the polymer product indicated that only the metallocene catalyst system was active during polymerization.

The addition of ATMER-163 to the Ziegler-Natta Ti-catalyzed polymerization resulted in a brief spike in electrostatic voltage from about neutral to about 600 volts positive as measured by a high capacitance-high resistance probe in the fluidized,bed. This quickly returned to neutral with much reduced fluctuation in the neutral static voltage around zero compared to before the ATMER-163 addition. The static voltage band slowly increase from about zero to +or −50 volts during the 12 hour ATMER-163 hold period. The electrostatic voltage increased to greater than −1000 volts when EX-371 catalyst was added but this returned to near neutral after about four hours. The static eventually stabilized at about -150 volts in a band about +or −200 volts for operation with the metallocene catalyst. Thermocouples located near the reactor wall at various locations in the fluidized bed decreased to the −10 to −25° C. range relative to the core temperature of the fluidized a few hours after starting the metallocene catalyst feed. This indicated the collection of an insulating layer of polymer particles along the reactor wall. The skin thermocouple reading returned to normal within about 10 hours, which was about 5° to 10° C. less than the core temperature. One of the skin thermocouples spiked at about a three hour interval to about 5° C. above the bed temperature for just a few minutes. There were no agglomerated fused resin sheets or chunks found in the granular polymer product discharged from the reactor during the metallocene polymerization. It would have been possible to continue or restart ATMER-163 addition during the time that the metallocene catalyst addition was initiated or in response to electrostatic or skin thermocouple activity. The ATMER- 163 was purged with nitrogen prior to use but no measure was taken in this case to remove possible water contamination. It was speculated that the use of dried ATMER-163 would improve the transition, as water was known to sometimes cause operability problems such as static and wall skin thermocouple activity when used in this particular transition.

While the present invention has been described and illustrated by reference to particular embodiments, it will be appreciated by those of ordinary skill in the art that the invention lends itself to variations not necessarily illustrated herein. For example, it is not beyond the scope of this invention to transition between one or more mixed catalysts to one or more incompatible mixed catalysts and vice-versa. For this reason, then, reference should be made solely to the appended claims for purposes of determining the true scope of the present invention.

What is claimed is:

1. A process for transitioning from a first polymerization reaction conducted in the presence of a first catalyst, to a second polymerization reaction conducted in the presence of a second catalyst wherein the first and second catalysts are incompatible, the process comprising:
   (a) discontinuing the introduction of the first catalyst into a reactor wherein the first catalyst comprises a Ziegler-Natta catalyst;
   (b) introducing and dispersing in the reactor an effective amount of a non-volatile adsorbent to deactivate the first catalyst and substantially halt the first polymerization reaction; and
   (c) introducing and dispersing in the reactor the second catalyst wherein the second catalyst comprises a MAO-based, single-site catalyst.

2. The process of claim 1 wherein the first polymerization reaction and the second polymerization reaction comprise a gas phase process.

3. The process of claim 1 wherein the first polymerization reaction and the second polymerization reaction are conducted in a fluidized bed reactor.

4. The process of claim 1 wherein the process is continuous.

5. The process of claim 1 wherein the Ziegler-Natta catalyst comprises a titanium-triethylaluminum catalyst.

6. The process of claim 1 wherein the MAO-based, single-site catalyst comprises a metallocene catalyst.

7. The process of claim 1 wherein the non-volatile adsorbent is selected from the group consisting of a solid polymer and compounds that are a non-volatile liquid under the conditions in the reactor.

8. The process of claim 7 wherein the non-volatile adsorbent is a solid polymer and comprises at least one functional group capable of effectively deactivating the first catalyst.

9. The process of claim 7 wherein the non-volatile adsorbent is a solid polymer and comprises at least one functional group capable of reacting with an aluminum alkyl.

10. The process of claim 7 wherein the non-volatile adsorbent is a solid polymer and comprises a long chain copolymer of ethylene and a substituted alkene.

11. The process of claim 7 wherein the non-volatile adsorbent comprises a long chain co-or ter-polymer of ethylene and one or more co-monomers selected from the group consisting of acrylates, vinyl esters, olefinic anhydrides, olefinic carboxylic esters, olefinic carboxylic acids, olefinic ethers, olefinic amines, olefinic alcohols, olefinic amides, olefinic imines, and olefinic thiols.

12. The process of claim 7 wherein the non-volatile adsorbent comprises one or more long chain polymers selected from the group consisting of poly(ethylene-co-vinyl acetate), poly(ethylene-co-methyl acrylate), poly(ethylene-co-acrylic acid), poly(ethylene-co-methacrylic acid), poly (ethylene-co-ethyl acrylate-co-maleic anhydride), poly(ethylene-co-butyl acrylate-co-maleic anhydride), poly(ethylene oxide) and poly(ethylene imine).

13. The Process of claim 12 wherein the non-volatile adsorbent comprises one or more long chain polymers selected from the group consisting of poly(ethylene-co-acrylic acid), poly(ethylene-co-ethyl acrylate-co-maleic anhydride), poly(ethylene-co-butyl acrylate-co-maleic anhydride) and poly(ethylene-co-vinyl acetate).

14. The process of claim 12 wherein the non-volatile adsorbent comprises one or more long chain polymers selected from the group consisting of poly(ethylene-co-acrylic acid), poly(ethylene-co-ethyl acrylate-co-maleic anhydride), poly(ethylene-co-butyl acrylate-co-maleic anhydride) and poly(ethylene-co-vinyl acetate).

15. The process of claim 7 wherein the non-volatile liquid under the conditions in the reactor comprises a compound selected from the group consisting of alkoxylated amines, alkoxylated amides, carboxylic acids, thiols, and alcohols.

16. The process of claim 14 wherein the non-volatile liquid under the conditions in the reactor comprises a long-chain diethanolamine.

17. The process of claim 15 wherein the non-volatile liquid under the conditions in the reactor comprises N-octadecyl-diethanolamine.

18. The process of claim 15 wherein the non-volatile liquid under the conditions in the reactor comprises N-hexadecyl-diethanolamine.

* * * * *